Patented Apr. 16, 1929.

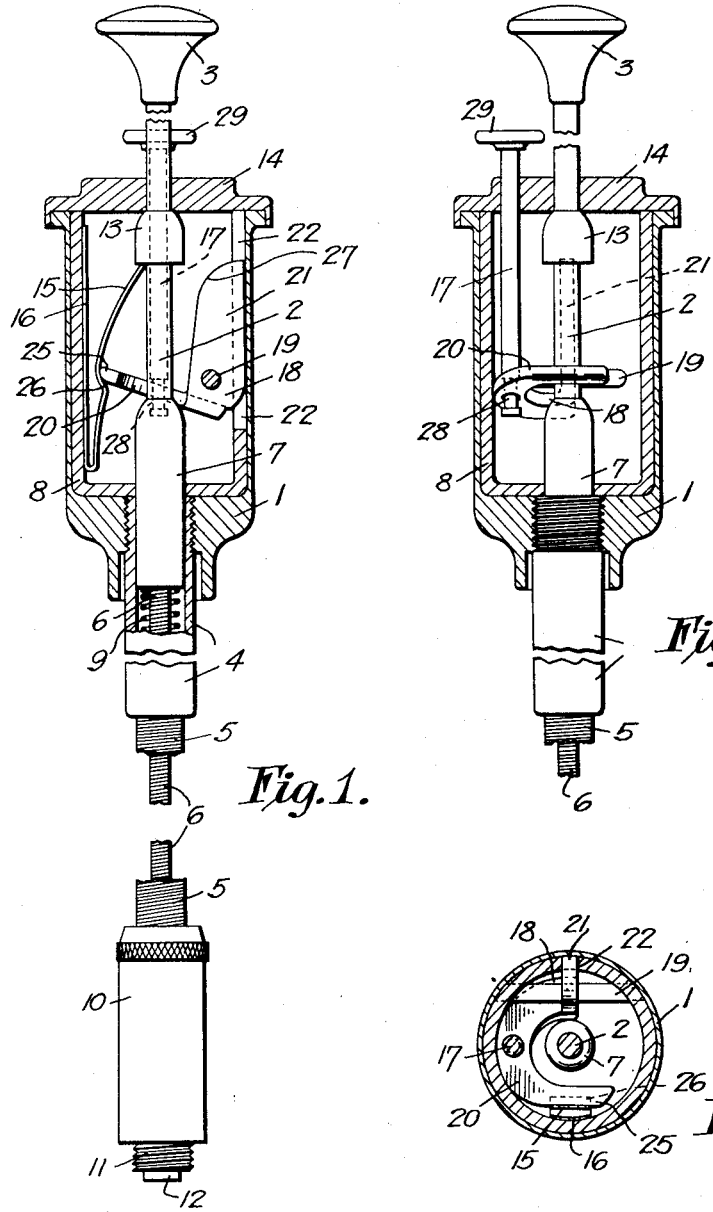

1,709,473

UNITED STATES PATENT OFFICE.

ELINORE E. HARDE, OF RIDGEFIELD, CONNECTICUT.

SHUTTER-OPERATING DEVICE OR ATTACHMENT FOR CAMERAS.

Application filed November 3, 1925. Serial No. 66,434.

This invention relates to a shutter operating device or attachment for cameras, and has for its object the prevention of the taking of double exposures, by giving a positive reminder to the user of the camera of the necessity of advancing the film before taking a picture.

It is a constant source of annoyance to photographers, particularly amateur photographers, to find that, due to omission to advance the film after taking a picture, two exposures have been made upon a single section of the film, thus not only wasting that portion of the film, but spoiling both pictures, the latter being in many cases the more important consideration, due to the impossibility in such cases of retaking the pictures under the particular conditions existing at the time the original exposures were made.

The object of the present invention is to provide means for positively locking the operating member of the device or attachment against operation until the locking means is manually released, thus providing a positive reminder or indication of the necessity for advancing the film before the device or attachment can be operated. By this means the making of double exposures will be prevented, or at least reduced to a minimum.

Another object of the invention is to provide a device or attachment having the aforesaid locking means, which will be of the utmost simplicity; which will have a minimum number of parts; which can be very economically manufactured; and which will be of substantially the same size and appearance of the shutter operating devices or attachments now in use.

One form of shutter operating device or attachment constructed in accordance with the present invention is illustrated in the accompanying drawings, but it is to be understood that this form is shown by way of example only, and that the invention is not limited to the particular form or details of construction now to be described.

In the drawings; Fig. 1 is an enlarged vertical sectional view of a shutter operating device or attachment according to the present invention;

Fig. 2 is another sectional view of the device, the plane of the section being at right angles to the plane of the section in Fig. 1; and Fig. 3 is a sectional plan view of the device taken approximately on the line 3, 3 of Fig. 2.

The invention is shown in the drawings as applied to the usual shutter operating attachment for cameras which is adapted to be attached to the camera adjacent the shutter mechanism and in which the operating member actuates said mechanism through a flexible mechanical connection or Bowden wire.

The attachment comprises a supporting member or head 1 within which the operating member 2 is supported and guided, this operating member having a button or head 3 on the exterior of the supporting member 1, the arrangement as usual being such that the supporting member 1 may be held between the fingers of one hand and the operating member moved by pressure of the thumb upon the button 3. It will be understood that for clearness of illustration the attachment is shown in the drawings on a much enlarged scale.

Screw-threaded into the lower part of the supporting member 1 is a tubular member or sleeve 4 within the lower part of which is secured in any suitable manner the outer element or sheath 5 of a Bowden wire, the inner element or core 6 of which extends within the sleeve 4 and is connected to or extends to a position to be operated by the lower end of the operating member 2. The lower end of the operating member is preferably provided with a somewhat enlarged portion 7 which slides within the sleeve 4 and to which the core 6 is secured in any suitable manner. Between the lower end of the enlarged portion 7 of the operating member and a shoulder within the sleeve 4 is interposed a spring 9 which effects the return movement of the operating member 2 to its initial position.

The other end of the outer element or sheath 5 of the Bowden wire is as usual connected to a member 10 provided with a screw threaded portion 11 by means of which it may be secured to a suitable part of the camera adjacent the shutter mechanism and the inner element or core 6 of the Bowden wire is connected at its other end to the terminal 12 which coacts with the shutter mechanism.

The attachment so far described operates in the same manner as the usual shutter operating attachment, that is to say, the terminal 12 is positioned in operative relation to the shutter mechanism by the securing of the member 10 to an adjacent part of the camera, so that when the operating member 2 is moved inwardly by pressure upon the button 3 the movement will be transmitted by the inner element or core 6 of the Bowden wire to said terminal 12 which will be moved to operate the shutter mechanism, the spring 9 returning the operating member 2 to its initial position as shown in the drawings when the pressure on the button 3 is released.

As previously stated, it very frequently happens that the user of a camera will neglect to advance the film after having operated the operating member 2 to actuate the shutter mechanism to make an exposure, so that when the shutter mechanism is again operated through the medium of the operating member 2 the same section of the film will be exposed a second time, thus spoiling both of the pictures by having them exposed on the same section of film.

The making of double exposures in this way is prevented by the means forming the subject matter of the present invention and which will now be described.

The upper part of the supporting member or head 1 is hollow and within the same the operating member 2 is provided with an enlargement 13 which normally engages the end or cap 14 of the supporting member to limit the return movement of said operating member. The end or cap 14 may be secured to the body of the supporting member 1 in any suitable way, as by brazing, screw-threading or the like.

Mounted within the supporting member 1 is a sleeve or cup 8 forming a lining for the supporting member, and which carries the locking and releasing members now to be described. The locking member 15 is shown as a resilient plate which normally tends to move toward the axis of the operating member 2, so that its upper end will normally tend to engage beneath the enlargement 13, as indicated particularly in Fig. 1. For convenience in mounting the locking member or plate within the sleeve or cup 8, it may be formed of a strip of material bent into substantially the form of a U, which may rest at its lower end if desired upon the inner bottom wall of the cup 8, and which has the outer arm 16 thereof secured against the inner wall of the cup 8 in any suitable manner, as by brazing. It will be seen that the engagement of the locking member 15 beneath the enlargement 13 positively holds the operating member 2 against operation.

The locking member 15 is adapted to be released, to permit movement of the operating member 2, by means of a pivoted releasing member or lever 18 which is pivoted upon a pin 19 passing through apertures in the walls of the sleeve or cup 8, as shown in Fig. 3. The member 18 in the form shown comprises a curved arm 20 extending partway around the interior of the sleeve or cup 8, as shown particularly in Figs. 2 and 3, and an upwardly bent arm 21 through the lower part of which the pivot pin 19 passes, the outer portion of this arm 21 lying within a slot 22 in the wall of the sleeve 8 whereby the releasing member or lever is properly held and guided. The portion of the arm 20 opposite the pivot is provided with a releasing portion 25 which is adapted to co-act with the reversely curved or cam-shaped portion 26 of the locking member 15. Thus it will be seen that by manually moving the member 18 about its pivot 19 in a counter clockwise direction, Fig. 1, the arm 20 will be moved downwardly so as to bring the releasing portion 25 into engagement with the inwardly projecting cam portion 26 of the locking member 15, thus moving said locking member to the left, Fig. 1, to carry the upper end thereof from beneath the enlargement 13 of the operating member 2. This entirely releases the operating member and permits the same to be operated to actuate the shutter mechanism so that an exposure will be made. This manual releasing movement of the member 18 is effected by means of a stem or rod 17 which is connected, by a loose connection indicated at 28, with the arm 20, and which extends upwardly through the cap 14 and is provided at its upper end with a button 29. By pressing downwardly on this button, the lever 18 is operated in the manner described.

The upwardly bent arm 21 of the releasing member 18 is provided with a cam-shaped portion 27 which, when the member 18 is operated to release the locking member 15, is brought inwardly into the path of movement of the enlargement 13, so that when the operating member 2 is moved downwardly to actuate the shutter mechanism, the enlargement 13 by engagement with the cam surface 27 will return the releasing member 18 to its initial position as indicated in the drawings. This movement may be assisted by the resilient action of the locking member 15, through its cam portion 26, against the portion 25 of the arm 20. Thus the portion 25 of arm 20 will be moved upwardly to its initial position above the cam portion 26 of the locking member 15 so that this locking member will return to its innermost position, and on the return movement of the operating member 2 it will again move beneath the enlargement 13 of the operating member so that this member will be again locked against operation.

It will be clearly understood that when an exposure has been made and the operating member 2 is returned to its normal position the locking member 15 will immediately lock the operating member so that it can not be again operated until the locking member is released by manually operating the releasing stem or rod 17 so that if the user of the camera should again try to move the operating member he will find it locked against operation and this will serve to remind him that the film must be advanced before the next picture is taken. He will accordingly advance the film the necessary amount and will then operate the stem 17 and member 18 to release the locking member. The operating member 2 can then be operated to make the exposure and on its return movement it will again be locked against further operation. If the user of the camera advances the film immediately after taking a picture he can then at once release the locking member 15 so that the operating member 2 can be actuated at any time thereafter to make the new exposure, or he may leave the locking member in locked position until the picture is to be taken to thereby prevent the exposure of the film by accidental operation of the operating member. The improved device or attachment thus serves as a positive reminder or indication of the necessity for advancing the film before taking a picture and it also provides a locking device for preventing inadvertent or accidental operation of the shutter mechanism.

It will be understood that the improvement forming the subject matter of the present invention may be employed in connection with other mechanism than the shutter mechanisms of cameras, that is, it may be employed in numerous cases where an operating member is to be releasably locked after each operation thereof.

It will also be understood that the invention is not restricted to the particular structural arrangements or details thereof hereinbefore described, as the same may be widely varied within the scope of the appended claims.

What I claim and desire to secure by Letters Patent is:

1. Shutter operating attachment for cameras, comprising a hand supported member or head, an operating member carried by said head and having an operative movement from a normal inoperative position, and means also carried by said head adapted to positively lock said member to prevent such operative movement thereof.

2. Shutter operating attachment for cameras, comprising a hand supported member or head, an operating member carried by said head and having an operative movement from a normal inoperative position, and a manually releasable means also carried by said head and adapted to positively lock said member to prevent such operative movement thereof.

3. Shutter operating attachment for cameras, comprising a hand supported member or head, an operating member carried by said head, and means for positively locking said member against operation adapted to be manually released to permit the operative movement of said member and automatically relocking said member on the return movement thereof.

4. Shutter operating device or attachment for cameras, comprising a supporting member or head, an operating member carried by said head, means carried by said head adapted to automatically and positively lock said member against operation as said member assumes its normal inoperative position, and other means also carried by said head and operative to release said locking means.

5. An operating device or attachment of the character described, comprising an operating member, means adapted to positively lock said member against operation, means manually operable to release said locking means and operable by said operating member during its operative movement to free said locking means to permit the same to again assume locking position, and supporting means for said member and means.

6. Shutter operating device or attachment for cameras, comprising a supporting member or head, an operating member carried by said head and having an operative movement in a single direction from a normal position, means also carried by said head and adapted to positively lock said member against such movement, and means also carried by said head operative to move said locking means out of locking position and to hold said locking means in said position until said operating member has been operated.

7. An operating device or attachment of the character described, comprising an operating member, means adapted to positively lock said member against operation, means manually operable to release said locking means, means on said operating member for restoring said releasing means to permit said locking means to resume locking position, and supporting means for said member and means.

8. An operating device or attachment of the character described, comprising an operating member having an operative movement in a single direction from a normal position, a resilient-plate normally assuming locking position relatively to said operating member to prevent such movement thereof, means operating to move said resilient plate against its spring action to free said operating member, and supporting means for said member and means.

9. An operating device or attachment of the character described, comprising an operating member, spring means normally assuming locking position relatively to said operating member, means manually operative to move said locking means against its spring action to free said operating member, means on said operating member adapted during the operative movement thereof to restore the second named means to free said locking means, and supporting means for said member and means.

10. An operating device or attachment of the character described, comprising a longitudinally movable operating member, locking means movable toward and from the axis of said operating member and normally engaging said member to lock the same against operation, means movable in the same direction as the operative movement of said member to release said locking means and reversely movable by said operating member during the operative movement thereof to permit said locking means to return toward locking position, and supporting means for said member and means.

11. An operating device or attachment of the character described, comprising an operating member having a shoulder thereon, a spring plate normally held by its spring action in engagement with said shoulder to lock said operating member, means operative to engage said plate to force the same away from said shoulder to free said operating member, and supporting means for said member, plate and means.

12. An operating device or attachment of the character described, comprising an operating member, means for positively locking said member against operation, a pivoted lever manually movable in one direction to release said locking means and reversely movable by said operating member to free said locking means, and supporting means for said member, means and lever.

13. An operating device or attachment of the character described, comprising an operating member, means for positively locking said member against operation and having a cam portion thereon, a manually movable pivoted lever having a part engageable with said cam portion to release said locking means and also having a cam portion thereon, means on said operating member adapted during the operative movement thereof to engage the cam portion on the lever to restore said lever and free said locking means, and supporting means for said member, means and lever.

14. Shutter operating attachment for cameras, comprising a hand supported member, flexible mechanical operating means carried thereby, an operating member also carried by said supporting member and movable from a normal inoperative position to actuate said flexible operating means, and releasable locking means on said supporting member normally preventing operating movement of said operating member from said normal position.

15. An operating attachment of the character described, comprising a supporting member, flexible mechanical operating means carried thereby, an operating member also carried by said support and movable to actuate said flexible operating means, means also carried by said support normally locking said member against operation adapted to be manually released to permit operation of said member and automatically relocking said member on the return movement thereof.

16. An operating attachment of the character described, comprising a supporting member, flexible mechanical operating means carried thereby, an operating member also carried by said support and movable to actuate said flexible operating means, locking means carried by said support normally preventing operative movement of said member, and manually operated releasing means also carried by said support for releasing said locking means.

17. An operating attachment of the character described, comprising a support, flexible mechanical operating means carried thereby, an operating member carried by said support and movable to actuate said operating means, means on said support normally locking said operating member against movement, and releasing means on said support manually operable to release said locking means and operable by said operating member to free said locking means.

18. An operating attachment of the character described, comprising a support, a Bowden wire having one element thereof fixed to said support, an operating member carried by said support and operatively associated with the movable element of said Bowden wire, means on said support normally locking said operating member against movement, manually releasable to free said operating member and automatically relocking said member on its return movement.

19. An operating attachment of the character described, comprising a support, a Bowden wire having the fixed element thereof secured to said support, an operating member carried by said support and operatively associated with the movable element of said Bowden wire, means on said support normally locking said operating member against movement, releasing means on said support manually operable to release said locking means, and means on said operating member for restoring said releasing means to free said locking means.

20. An operating device or attachment of the character described, comprising a hollow supporting head, an operating member movable within said head and having an operating portion projecting therefrom, and a manually releasable means arranged within said head and adapted to coact with a part of said operating member within the head to positively lock said member against operation.

In testimony whereof I affix my signature.

ELINORE E. HARDE.